United States Patent [19]
Arnold

[11] Patent Number: 4,740,121
[45] Date of Patent: * Apr. 26, 1988

[54] REAMER WITH UNEQUALLY SPACED FLUTES

[75] Inventor: Wesley C. Arnold, Central, Utah

[73] Assignee: Rockwell International Corporation, El Segundo, Calif.

[ * ] Notice: The portion of the term of this patent subsequent to May 5, 2004 has been disclaimed.

[21] Appl. No.: 706,990

[22] Filed: Feb. 28, 1985

Related U.S. Application Data

[63] Continuation of Ser. No. 086,191, Oct. 18, 1979, Pat. No. 4,662,803.

[51] Int. Cl.⁴ ............................................. B23B 51/10
[52] U.S. Cl. ..................................... 408/224; 408/230
[58] Field of Search ............... 408/201, 202, 223, 224, 408/225, 229, 230

[56] References Cited

U.S. PATENT DOCUMENTS

| | | | |
|---|---|---|---|
| 396,663 | 1/1889 | Morisseau | 408/224 X |
| 595,346 | 12/1897 | Saacke | 408/229 |
| 1,643,679 | 9/1927 | Roderick | 408/225 |
| 2,362,260 | 11/1944 | Foster | 408/224 |
| 3,667,857 | 6/1972 | Shaner et al. | 408/241 X |
| 4,091,525 | 5/1978 | Karasiewicz et al. | 408/229 |

Primary Examiner—Z. R. Bilinsky
Attorney, Agent, or Firm—Charles T. Silberberg

[57] ABSTRACT

A reamer for making a tapered hole is disclosed. The reamer comprises a cylindrical forward portion joined to the front end of a conical rear portion, the rear portion tapering outwardly from its front end. The forward and rear portions have co-incident longitudinal axes and at least three cutting flutes extending continously on the forward and rear portions and which are unequally spaced about the longitudinal axes. In one embodiment the flutes are either aligned with or helical about the longitudinal axes; and furthermore are misindexed about the axes and therefore are unequally spaced apart. In another embodiment the flutes have different helix angles about the longitudinal axis. In other embodiments the cylindrical forward portion is eliminated leaving only the conical rear portion making a reamer suitable for enlarging holes having existing tapers.

12 Claims, 2 Drawing Sheets

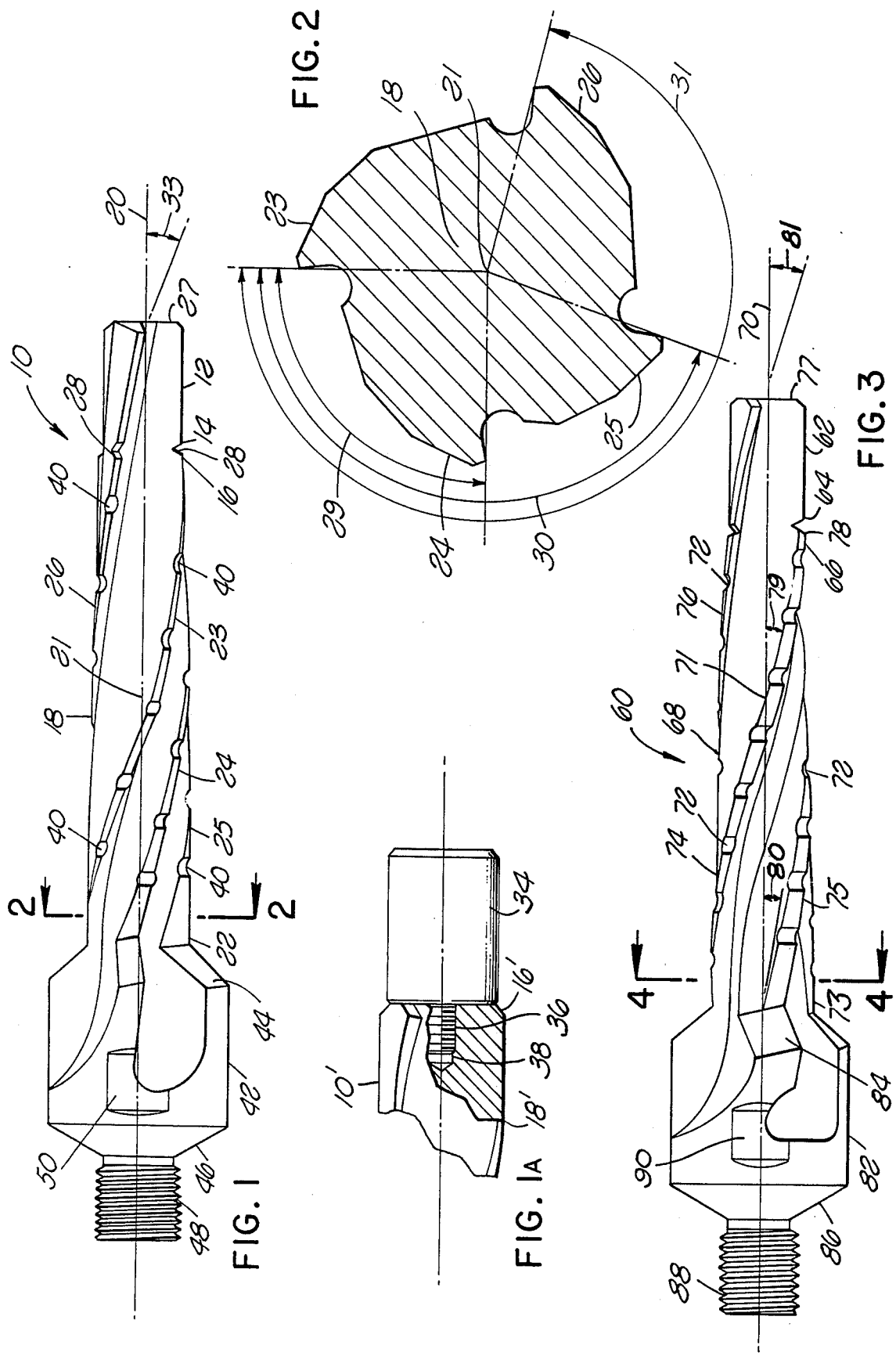

REAMER WITH UNEQUALLY SPACED FLUTES

This is a continuation of application Ser. No. 086,191, filed Oct. 18, 1979, now U.S. Pat. No. 4,662,803.

BACKGROUND OF THE INVENTION

1. Field of Invention

The invention relates to the field of cutting tools, and, in particular to reamers for use in making tapered holes.

2. Description of Prior Art

Reaming a taper requires greatly enlarging one end of the hole, with this enlargement gradually decreasing toward the other end. Thus, a tapered reamer, instead of being a finishing tool is, in reality, required to remove a considerable amount of material. Furthermore, a tapered reamer's cutting surface at the finish of the operation, is engaged throughout the entire length of the hole. Because of this, tapered reamers are subjected to much greater torsional strains than the ordinary straight reamer that cuts only on the end. The tendency, therefore, is to chatter, rifle, cut out-of-round or otherwise produce unacceptable surface finishes. Conventional tapered reamers also require high thrust and torque levels and thus have short lives. There is also a possibility of flute chipping.

A typical application for such reamers is in the preparation of holes for Taper Lok fasteners. The problems mentioned above are multiplied because, in most Taper Lok fastener applications, the hole to be reamed extends through a multiple number of parts, which may be made of different materials. Prior methods of preparing the hole required the drilling of a pilot hole, rough reaming, and fine reaming with a six fluted reamer. Quite often the hole has to be finished off with a hand reamer. Obviously, this is a time consuming and expensive procedure.

Most unacceptable surface finishes in straight or tapered holes are caused by vibrations or chatter. This problem was recognized in U.S. Pat. No. 265,998, "Reamer" by G. R. Valentine. Valentine discloses a cylindrical shank having a plurality of sets of cutting ribs equally spaced about the longitudinal axis of the shank. Each set of cutters comprises a first cutter aligned with the longitudinal axis of the shank and a second cutter at a slight angle to the longitudinal axis. These latter angled or diagonal cutter ribs alternate from right to left and from left to right. While such a configuration would probably reduce chattering in cylindrical bore, a tapered version would not have the required effectiveness when reaming tapered holes.

Accordingly, it is a general object of the present invention to provide a reamer for making tapered holes that reduces or eliminates surface imperfections.

It is another object of the present invention to provide a reamer with an extended life.

It is a further object of the present invention to provide a reamer which reduces thrust and torque load requirements of the driver.

SUMMARY OF THE INVENTION

The invention is directed to a reamer for making a tapered hole. The reamer comprises a cylindrical forward guide portion joined to the front end of a conical rear portion, the rear portion tapering outwardly from its front end. The forward and rear portions having coincident longitudinal axes and at least three cutting flutes extending continuously on the forward and rear portions and which are unequally spaced about the longitudinal axes.

In one embodiment the flutes are misindexed about the longitudinal axes and therefore are unequally spaced apart. In this embodiment the flutes can either be aligned with or helical about the longitudinal axis. Preferably, there are four misindexed flutes with the first, second, and third flutes spaced from the fourth flute by about 90, 160, and 225 degrees, respectively.

In a second embodiment the flutes have different helix angles about the longitudinal axes. Preferably, there are three flutes having angles of about 12, 13 and 16 degrees, respectively.

In other embodiments the cylindrical forward portion is eliminated leaving only the conical rear portion, thus making a reamer suitable for use in enlarging holes having existing tapers. Additional features are the incorporation of a countersink cutter at the rear end of the conical portion and staggered chip breaking grooves on the flutes.

The novel features which are believed to be characteristic of the invention, both as to its organization and its method of operation, together with further objects and advantages thereof, will be better understood from the following description in connection with the accompanying drawings in which presently preferred embodiments of the invention are illustrated by way of examples. It is to be expressly understood, however, that the drawings are for purposes of illustration and description only, and are not intended as a definition of the limits of the invention.

BRIEF DESCRIPTION OF THE DRAWINGS

FIG. 1 is a side elevation view of a first, preferred embodiment of the reamer having misindexed helical cutting flutes.

FIG. 1a is a partial view of the reamer shown in FIG. 1 illustrating a modification thereto.

FIG. 2 is an enlarged cross-sectional view of the reamer illustrated in FIG. 1 along the line 2—2.

FIG. 3 is a side elevation view of a second, preferred embodiment of the reamer having cutting flutes at different helix angles.

DESCRIPTION OF THE PREFERRED EMBODIMENTS

Figure 4:
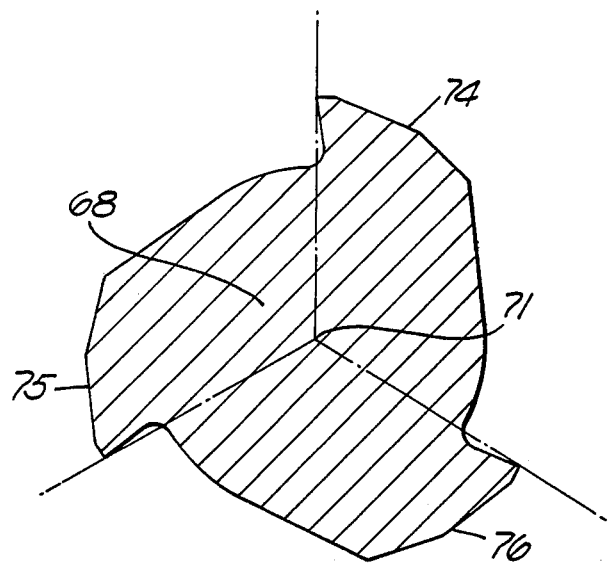
FIG. 4 is an enlarged cross-sectional view of the reamer illustrated in FIG. 3 along the line 4—4.

Illustrated in FIG. 1 is a side elevation view of a presently preferred embodiment of the reamer designated by numeral 10. FIG. 2 is a cross sectional view of the reamer 10 illustrated in FIG. 1 along the line 2—2. The reamer 10 comprises a cylindrical forward guide portion or core 12 having a first end 14 coupled to a first end 16 of a conical rear portion or core 18, such that their longitudinal axes 20 and 21, respectively, are coincident. The rear portion 18 tapers outwardly to a second end 22 with the taper angle being equal to the required taper of the hole to be reamed. The rear portion 18 has at least three helical cutting flutes extending continuously along the longitudinal axis 21 and preferably four, as shown, designated by numerals 23, 24, 25 and 26.

The forward portion 12 is normally used only as a guide to center the rear portion 18 with the hole to be reamed, and also provides support for the cutting edges as torque is applied but, as can be seen, the flutes 23-26 are extended onto the forward guide portion 12 to its second end 27. This is done, because, such reamers are usually machined or ground, and being able to begin the metal removal from the second end 27 greatly facilitates reamer manufacture. The portion of the flutes 23-26 extending over the forward guide portion 12 are normally non-cutting. Thus, a cutter relief, in the form of a notch 28, is incorporated in each of the flutes 23-26 at the end 16 of the rear portion 18 to provide a start for the cutting edges and to reduce cutting loads on said flutes (only the notch 28 on the flutes 23 and 26 is shown). Of course the flutes 23-26 on the forward portion 12 could be used to make a cylindrical enlargement of the hole prior to tapering, but it is not common practice.

The flutes 23-26 are misindexed about the co-incident longitudinal axes 20 and 21, thus they are unequally spaced from each other. By doing so, it has been found that resonances are damped out eliminating chatter. It has been determined that it is preferable to have flutes 24, 25 and 26 spaced from the flute 23 by an angle 29, equal to about 90 degrees, an angle 30 equal to about 160 degrees, and an angle 31 equal to about 255 degrees, respectively. The preferred helix angle 33 for all flutes is about 15 degrees. This spacing damps out any vibration and yet provides adequate spacing between the flutes 23-26 for chip removal and also facilitates manufacture of the reamer. More flutes can be added but the increase in performance has been presently found not to warrant the increased manufacturing costs. On the other hand three flutes will provide adequate performance in many applications, but dropping the number of flutes to two provides unacceptable performance.

It is of course possible to provide a reamer without flutes on the forward portion 12. Illustrated in FIG. 1a is a modified version of the reamer illustrated in FIG. 1. The reamer 10' comprises a conical rear portion 18'. A guide portion 34 incorporates a threaded member 36 adapted to engage a threaded hole 38 in the end 16' of the rear portion 18' for attachement thereto.

Again referring to FIG. 1, it can be seen that the flutes 23-26 incorporate a plurality of chip breaking notches 40 that run along the rear portion 18. In order to provide better chip break-up, a reduction in cutting pressure, and an even smoother finish, the notches 40 on each flute are staggered with those located on each preceding flute.

Additionally, if the holes to be reamed also are to be countersunk (for example holes for flush head fasteners) a countersink cutter can be incorporated by attaching a cylindrical body 42 having a countersink cutter 44 at the second end 22 of the rear portion 18. Thus reaming and countersinking can be accomplished in one operation.

Furthermore, a threaded member 48 adapted to attach the reamer 10 to a power driver (not shown) is coupled at the end 46 of the body 42. Wrench flats 50 (only one of which is shown) are provided on the cylinder portion 42 to facilitate attaching of the reamer to a powered driver.

Illustrated in FIG. 3 is a side elevation view of a second presently preferred embodiment of the reamer designated by numeral 60. Illustrated in FIG. 4 is a cross-sectional view of the reamer 60 shown in FIG. 3 along the line 4—4. The reamer 60 is similiar to the reamer 10 illustrated in FIGS. 1 and 2 and therefore comprises a cylindrical forward guide portion or core 62 having a first end 64 coupled to a first end 66 of a conical rear portion or core 68 such that their longitudinal axes 70 and 71, respectively, are coincident. The rear portion 68 tapers outwardly from its first end 66 to a second end 73. The rear portion 68 has at least three helical cutting flutes extending continuously along its longitudinal axis 71 and preferably there are only three flutes as shown, designated by numerals 74, 75, and 76.

The forward portion 62 is normally used only as a guide to center the rear portion 68 with the hole to be reamed and to provide support. But as with the reamer 10, disclosed in FIGS. 1 and 2, it is normal practice to blend and extend the flutes 74-76 onto the forward portion 62 to its second end 77. A cutter relief in the form of a notch 78 is provided on each of the flutes 74-76 at the end 66 of the rear portion 68, again to provide a start for the cutting edges and to reduce cutting loads. The flutes 74, 75, and 76 are at different helix angles designated by numeral 79, 80, and 81 respectively, to the longitudinal axis 72 and therefore are unequally spaced from each other. The preferred helix angles 79, 80 and 81 are about 12, 13 and 16 degrees, respectively. Since it is preferred to continue the flutes 74-76 over the forward portion 62, it is advantageous to have the front faces of the flutes (not shown) equidistant around the longitudinal axis. Thus, at any point behind the second end 77, the flutes are unequally spaced around the longitudinal axes 70 and 71.

As in the case of the reamer 10 disclosed in FIGS. 1 and 2 the flutes 74-76 incorporate a plurality of chip breaking notches 72 along the rear portion 68 in a staggered relationship. The end 73 of the rear portion 68 incorporates a cylindrical body 82 having a countersink cutter 84. At the end 86 of the body 82 is a threaded member 88 for attachment of the reamer 60 to a power driver (not shown). Wrench flats 90 (only one is shown) are provided to facilitate attaching of the reamer to the power driver. More flutes can be added but, as in the case of the embodiment illustrated in FIGS. 1 and 2, the increase in performance has presently been found not to warrant the increased manufacturing costs. On the other hand, reducing the number of flutes to two, provides unacceptable performance.

Figure 5:
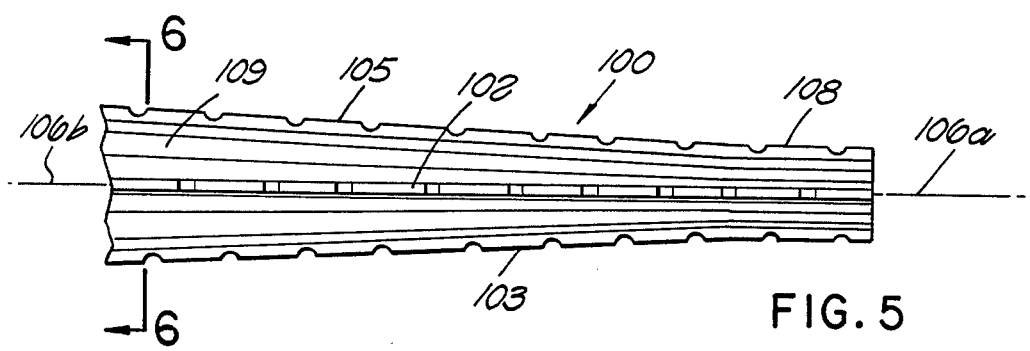
FIG. 5 is a side elevation view of a third, preferred embodiment of the reamer having misindexed straight flutes.
Figure 6:
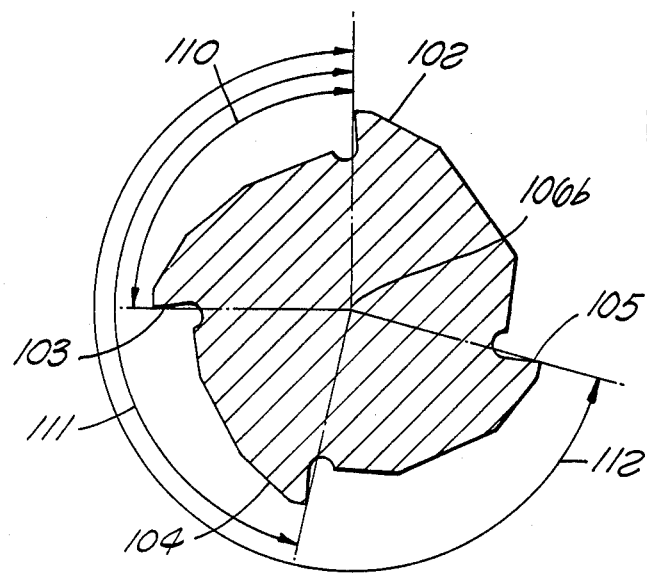
FIG. 6 is an enlarged cross-sectional view of the reamer illustrated in FIG. 5 along the line 6—6.

Illustrated in FIG. 5 is a side elevation view of a third, presently preferred embodiment of the reamer designated by numeral 100. FIG. 6 is a cross sectional view of the reamer 100 illustrated in FIG. 5 along the line 6—6. The reamer 100 is in all respects similar to the reamer disclosed in FIGS. 1 and 2 except that reamer 100 has misindexed flutes 102, 103, 104, and 105 which are aligned with the longitudinal axes 106a and 106b rather than being helical on the cylindrical front portion 108 and conical rear portion 109. The flutes 103, 104, 105, are spaced from the flute 102 by an angle 110 equal to about 90 degrees; an angle 111 equal to about 160 degrees, and an angle 112 equal to about 255 degrees, respectively. All features applicable to the reamer 10 disclosed in FIGS. 1 and 2 are applicable to reamer 100. While the use of aligned flutes does not provide the high cutting rates obtainable with helical flutes, the cost of manufacturing is less.

Having thus described the invention, it is obvious that numerous modifications and departures may be made by those skilled in the art; thus, the invention is to be construed as being limited only by the spirit and scope of the appended claims.

What is claimed is:

1. A reamer for making a tapered hole comprising:
   a conical core having a longitudinal axis terminating in first and second ends, and
   first, second, third, and fourth flutes projecting from said core, said flutes being generally unequally spaced from each other about said longitudinal axis and tapering outwardly from said first end of said core, said flutes winding helically about said longitudinal axis of said core, said first, second, and third flutes being spaced about said longitudinal axis from said fourth flute by about 90, 160, and 255 degrees, respectively.

2. The reamer of claim 1 wherein said flutes each have a helix angle of about 15 degrees to said longitudinal axis of said core.

3. The reamer of claim 2 wherein each of said flutes incorporates a plurality of chip breaking grooves along said longitudinal axis of said core, said grooves on each flute being in a staggered relationship with said grooves on each other of said flutes.

4. The reamer of claim 1 wherein said flutes extend from said first end to said second end of said core.

5. The reamer of claim 4 wherein said flutes each have a helix angle of about 15 degrees to said longitudinal axis of said core.

6. The reamer of claim 4 wherein means to countersink the hole are attached to said second end of said core.

7. A reamer for making a tapered hole comprising:
   a conical core having a longitudinal axis terminating in first and second ends, and
   four flutes projecting from said core, said flutes being generally unequally spaced from other about said longitudinal axis and tapering outwardly from said first end of said core, said flutes winding helically about said longitudinal axis of said core, said flutes having a helix angle of about 15° to said longitudinal axis of said core.

8. The reamer of claim 7 wherein said flutes extend from said first end to said second end of said core.

9. The reamer of claim 8 wherein each of said flutes incorporates a plurality of chip breaking grooves along said longitudinal axis of said core, said grooves on each flute being in a staggered relationship with said grooves on each other of said flutes.

10. The reamer of claim 8 wherein means to countersink said hole are attached to said second end of said core.

11. A reamer for making a tapered hole comprising:
    a conical core having a longitudinal axis terminating in first and second ends, and
    first, second, third and fourth flutes projecting from said core, said flutes being unequally spaced from each other about said longitudinal axis with the spacing between adjacent flutes having a minimum variation of about 10 degrees, said flutes tapering outwardly from said first end of said core, said flutes winding helically about said longitudinal axis of said core.

12. The reamer of claim 11, wherein said flutes each have a helix angle of about 15 degrees to said longitudinal axis of said core.

* * * * *